June 9, 1925.  1,541,394
J. REIPAS
DEMOUNTABLE RIM FOR VEHICLE WHEELS
Filed June 1, 1922
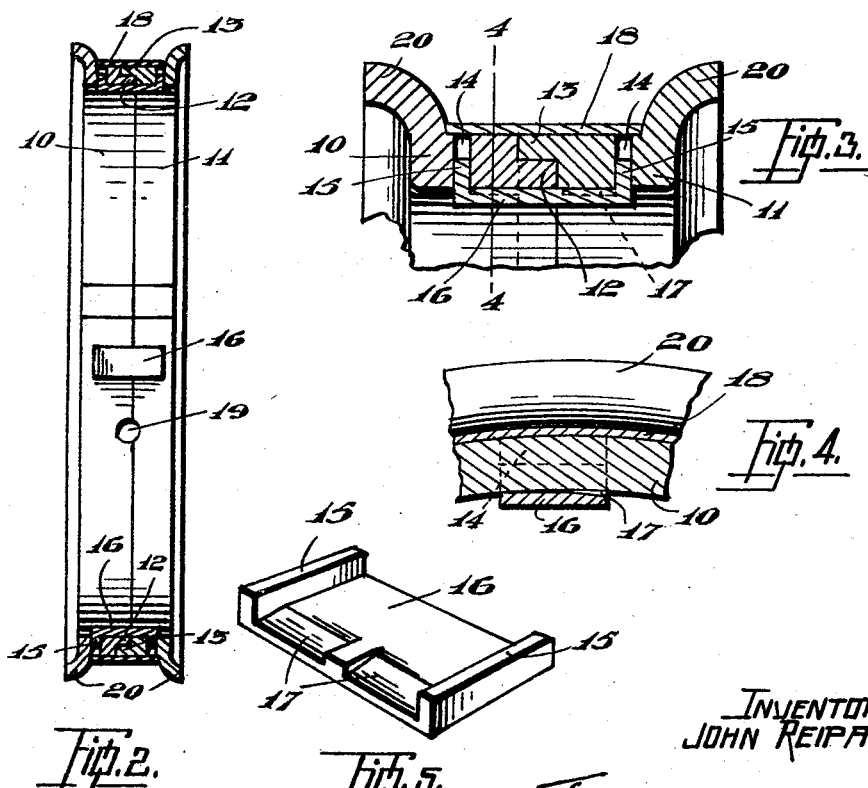
INVENTOR
JOHN REIPAS Patented June 9, 1925.

1,541,394

UNITED STATES PATENT OFFICE.

JOHN REIPAS, OF SUDBURY, ONTARIO, CANADA.

DEMOUNTABLE RIM FOR VEHICLE WHEELS.

Application filed June 1, 1922. Serial No. 565,241.

*To all whom it may concern:*

Be it known that I, JOHN REIPAS, a subject of the King of Great Britain, and resident of Sudbury, in the Province of Ontario, Dominion of Canada, have invented certain new and useful Improvements in Demountable Rims for Vehicle Wheels, of which the following is a specification.

This invention relates to demountable rims for vehicle wheels, and has for its objects to provide an improved demountable rim of the type adapted to be circumferentially split in two portions, to provide a means of securing the two portions together without the use of bolts or other fastening means, to provide a metallic band extending around the rim in order to reinforce the same and keep the two portions in engagement, to provide a circumferentially split rim having the inner edges of the two portions provided with annular shoulders designed to bear one against the other.

Further objects are to provide an improved fastening device for the rims in which a means is provided whereby the device can be easily removed or pried off from the rim.

Further objects are to provide an improved rim, that is simple in construction, not liable to go out of repair, and generally to adapt the several parts to better perform the functions required of them.

With the above and other objects in view, the invention consists essentially of the improved construction hereinafter described in detail in the accompanying specification and drawings.

In the drawings,

Figure 1 is a perspective view of the improved demountable rim.

Figure 2 is a transverse section through the rim.

Figure 3 is a fragmentary sectional detail through the rim.

Figure 4 is a cross section on the line 4—4 of Figure 3.

Figure 5 is a perspective view of the improved fastening or locking element.

Like characters of reference indicate corresponding parts in all the figures.

Referring to the drawings, A represents the improved demountable rim, which is circumferentially split in two portions 10 and 11. The portions 10 and 11 of the rim are provided at their inner edges with annular shoulders 12 and 13 designed to normally bear one against the other, and form a stepped joint as shown in Figure 3.

The two portions 10 and 11 of the rim are formed with a plurality of recesses or orifices 14 in alignment with one another and designed to engage the offset lugs 15 formed on each end of the locking element 16. The locking element is thus formed like a U-shaped plate engaging the two portions of the rim and locking the same together through the engagement of the lugs 16 with the recesses 14.

The locking element 16 is formed with a bevelled edge 17 designed to afford a means of engaging the end of a tool in order to remove by prying off the locking element 16 from the two portions 10 and 11 when the latter are desired to be brought apart. Although four of these locking elements 16 are shown in the drawings, it is obvious that more or less can be used according to the size of the wheel, and to the weight it is designed to carry, and the stress to which it is to be submitted.

The annular metallic band 18 is provided extending on the outer face of the rim, which is designed to coact with the cleat or locking element 16 in order to lock the two portions 10 and 11 of the rim together.

The rim is also bored as at 19, as shown to provide an orifice for the valve of the tire. When it is desired to place a tire on this improved rim, the portions are taken apart and the metallic band 18 being placed on the portion 10 of the rim, the tire is slipped over, then the portion 11 is inserted within the band and its shoulder 13 brought into engagement with the shoulder 12 of the portion 10, and the portion rotated until its orifices 14 are brought in registering position with the orifice 14 of the portion 10 of the rim.

When this has been done, the cleats or locking elements 16 are placed in position through the insertion of their offset lugs 15 into the recesses or orifices 14 of the two portions 10 and 11. When all these locking elements have been brought in engagement with the orifices of the two portions 10 and 11 of the rim, it will be obvious that the same will be securely locked, and that the tire on the rim will be prevented from falling off, as its pressure against the beadings 20 of the rims will only tend to force the portions apart, thus imparting on the lugs 15 on the locking element 16 a pressure which will securely lock them in position.

When the tire is to be removed the cleats or locking elements 16 are first removed through the edge of a tool such as a screw driver or suitable sharp edged tool being inserted underneath the bevelled edge 17 of the locking element 16, which is subsequently pried off.

When all of the locking elements 16 have been removed, the portion 11 may easily be slid out of engagement with the portion 11 and the band 18, when the tire may be easily removed from engagement with the band 18 and the second portion 10 of the rim.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. A demountable rim circumferentially split in two portions, each portion being provided with recesses, a metallic band engaging the two portions, and a plurality of locking elements formed with lugs, each engaging a recess in each portion, each locking element being formed with a bevelled edge designed to supply a grip for a tool to unlock the rim.

2. A demountable rim circumferentially split in two portions, each portion being provided with recesses, a metallic band engaging the two portions, and a plurality of locking elements formed with lugs, each engaging a recess in each portion, each locking element being formed with two bevelled portions along one edge to supply grips for a tool to unlock the rim.

In witness whereof I have hereunto set my hand in the presence of two witnesses.

JOHN REIPAS.

Witnesses:
MYRTLE MATHESON,
JAMES SOMERVILLE MCKESSOCK.